United States Patent [19]
Endou et al.

[11] 3,875,565

[45] Apr. 1, 1975

[54] PROGRAM ADDRESS CONTROL SYSTEM WITH ADDRESS ADVANCE ADDER FOR READ ONLY MEMORY

[75] Inventors: Hirohide Endou, Kodaira; Yoshiaki Kitazume, Sayama; Jun Kawasaki, Hachioji; Yoshikazu Hatsukano, Kodaira, all of Japan

[73] Assignee: Hitachi Ltd., Tokyo, Japan

[22] Filed: Dec. 26, 1973

[21] Appl. No.: 427,529

[30] Foreign Application Priority Data

Dec. 25, 1972 Japan .............................. 47-129259

[52] U.S. Cl. .............................................. 340/172.5

[51] Int. Cl. .............................................. G06f 9/16

[58] Field of Search ....................... 340/172.5; 444/1

[56] References Cited

UNITED STATES PATENTS

| | | | |
|---|---|---|---|
| 3,560,933 | 2/1971 | Schwartz | 340/172.5 |
| 3,631,400 | 12/1971 | Dervan et al. | 340/172.5 |
| 3,634,883 | 1/1972 | Kreidermacher | 340/172.5 |
| 3,713,108 | 1/1973 | Edstrom et al. | 340/172.5 |
| 3,753,242 | 8/1973 | Townsend | 340/172.5 |
| 3,774,166 | 11/1973 | Vigliante | 340/172.5 |
| 3,786,434 | 1/1974 | Frye et al | 340/172.5 |
| 3,794,979 | 2/1974 | McMahon | 340/172.5 |

*Primary Examiner*—Gareth D. Shaw
*Assistant Examiner*—John P. Vandenburg
*Attorney, Agent, or Firm*—Craig & Antonelli

[57] ABSTRACT

In the ROM (read-only memory) of this system, addresses starting from the first are sequentially assigned by an address register. When the output from a condition flip-flop and the signal from the address register produce a pattern predetermined for each address, the ROM delivers an output signal from an output terminal related to the address. Upon appearance of the output signal at the output terminal of an address, an instruction allocated to the address is executed. Furthermore, jumping from an address presently assigned to a preceding address and a temporary stay in the present address can be realized by controlling the contents of the above-mentioned condition flip-flop.

4 Claims, 6 Drawing Figures

PROGRAM ADDRESS CONTROL SYSTEM WITH ADDRESS ADVANCE ADDER FOR READ ONLY MEMORY

BACKGROUND OF THE INVENTION

1. Field of the Invention

This invention relates generally to program control systems including a Read-Only Memory (hereinafter simply called ROM), and more particularly to a type thereof adapted for controlling logic operations in table type electronic computers.

2. Description of the Prior Art

In a table type electronic computer employing a ROM, when an start pulse for initiating a data-processing operation thereof is generated by the application of a key input, the contents of the key input are encoded and set in a function flip-flop. The contents of the function flip-flop are thereafter decoded, and the kind of operations to be undergone is thereby determined. Based on this determination, further decoding is carried out for assigning an address in an ROM in which corresponding process programs are stored, and a first address of the process programs is set in a program counter. The process programs are thereafter sequentially read out, and the operations corresponding to the instructions included in the programs are successively put into practice through a control logic circuit. A termination command signal is included at the end of the process programs, and upon detection of the termination signal, all of the operations intended by the key input are completed.

An example of the conventional program control system used in a table type electronic computer is indicated in FIG. 1. In the initial state of the operation, a starting address is set in an address register 11. The contents of an ROM 12 indicated by the address are read out by a command decoder 13, and controls corresponding to the command thus read-out are then carried out.

Upon execution of the command, the contents in the address register 11 are added by one through an adder 14, and the results thus added are newly set in the address register 11 through an AND gate 16*b*.

In case where the contents of the ROM 12 indicate an address reached by jumping, the address is set in the address register 11 through another AND gate 16*a*. Furthermore, the return addresses in the case of jumping to sub-routines is stored in an evacuation address register 15, and these are thereafter set back in the address register 11 through still another AND gate 16*c*.

In this kind of control system, all of the addresses thus set in the address register 11 are effective, and the contents in the ROM 12 defined by these addresses are also utilized effectively. In other words, the control system includes substantially no redundancy in the operational periods of the address register 11 and the ROM 12, and this fact has constituted an advantageous feature of the conventional control system in elevating the operational speed. However, the conventional control system has required the evacuation address register, as described above, for storing the return addresses in the case of jumping to a sub-routine, and the number of bits required in the ROM have increased because the addresses of the jumped transfer must be memorized in the ROM. These features of the conventional control system are disadvantageous in view of the fact that the reduction of the cost is imperative in the small-size computer although the operational speed is somewhat sacrificed.

SUMMARY OF THE INVENTION

An object of the present invention is to provide a program control system having an address circuit which has substantially a jumping function without employing the evacuation address register.

Another object of the invention is to reduce the number of bits required in the ROM, and hence to reduce the production cost of the program control system.

For the achievement of the above-described two objects, the program control system according to the present invention is characterized in that it includes an address register for assigning addresses in the ROM and a plurality of condition flip-flops for indicating the present condition of the operation system, whereby the effectiveness or ineffectiveness of the present address in the ROM is judged from the contents of the condition flip-flop, and the variation of the addresses in the ROM is selected from three modes consisting of jumping to a preceding address, staying in the same address, and the addition by one of the present address.

The other objects and features of the present invention will be apparent from the following detailed description when read in conjunction with the accompanying drawings.

GENERAL PART OF THE INVENTION

The basic concept of the present invention will now be described with respect to three kinds of programs. In the first program shown in FIG. 2(A), A, B, C, D, E, and F represent unconditional commands (or instructions), respectively, J1 and J2 represent decision commands (or instructions). The marks ① through ⑧ represent addresses in the ROM wherein the above-described commands (or instructions) are stored.

In the first kind of the program, it is assumed that the result of the decision command J1 is NO, and the result of the decision command J2 is YES, so that the destinations of the jumping transfers are always in the subsequent addresses in the programs. In the execution of this kind of program, according to the conventional practice, the command A stored in the address ① of the ROM is firstly put into practice, and then the decision command J1 stored in the address ② thereof is carried out. When the results of the command J1 are found to be NO, the address assigned by the address register is jumped to the address ④, whereby the command C is carried out. Then the address ④ at that instant is further added by one so that another decision command J2 stored in the address ⑤ is carried out. Supposing that the results of the decision are yes, the address if further added by one thereby to proceed into the address ⑥. After the execution of the command D in the address ⑥, the program is unconditionally jumped to the address ⑧ to carry out the command F.

In other words, according to the conventional system, the assignment of the addresses in the ROM by the address register is shifted in the sequence of ①→②→④→⑤→⑥→⑧, whereby three kinds of jumping commands (two conditional jumps by J1 and J2 and one unconditional jump) and the destinations of the jumping commands are required.

According to the present invention, the contents of the address register is always increased by one, and hence the assignment of the addresses in the ROM follows the sequence of ①→②→③→④→⑤→⑥→⑦→⑧, and it is so controlled that the command B in the address③and the command E in the address⑦are not put into practice. By so doing, the jumping commands can be eliminated and the necessity of the evacuation address register is nullified. Furthermore, there is no necesssity to store the destination addresses in the ROM, and hence the required number of bits in the ROM can be substantially decreased.

Figure 1:
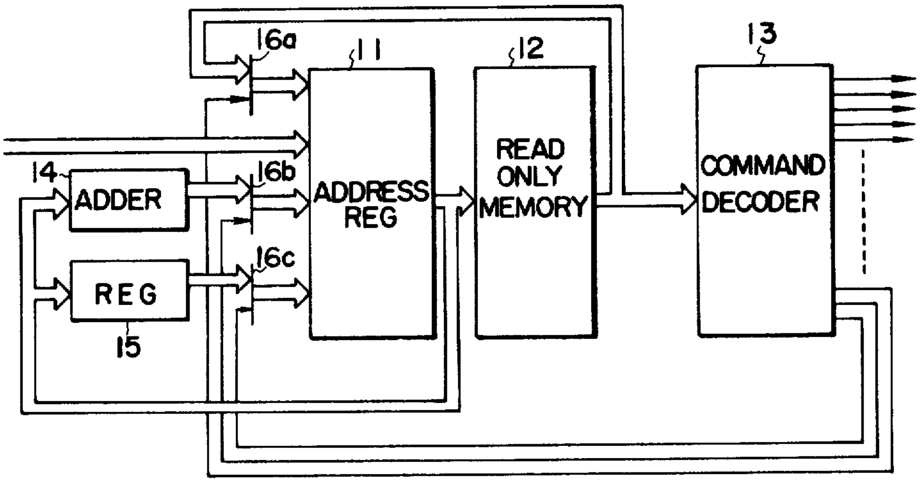
FIG. 1 is a block diagram showing a conventional program control.
Figure 2A:
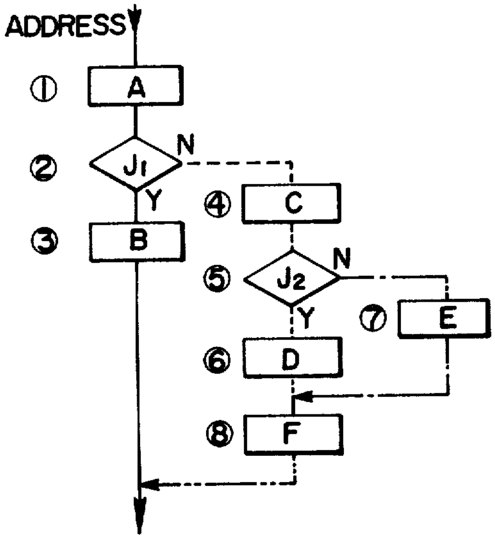
FIGS. 2(A), 2(B), and 2(C) are diagrams showing types of the programs used in the control system of this invention.
Figure 2B:
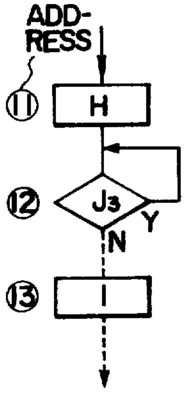

In FIG. 2(B), there is indicated another type of program wherein the process is advanced from an address ⑪ to an address ⑫ and remains there until the result of the decision command J3 becomes NO. In the execution of such a program in accordance with the present invention, the operation of a circuit adding one to the present address is stopped simultaneous with the attainment of the address ⑫ in the contents of the address register, and the operation is resumed to the operative state upon detection by the conditional flip-flop of the result NO of the decision command J3.

Figure 2C:
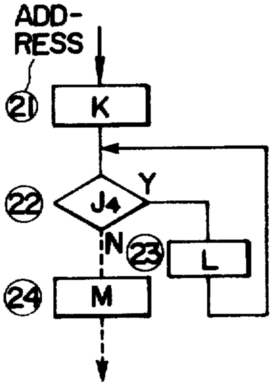

In FIG. 2(C), there is indicated a third example of the program, wherein the process is advanced in the sequence of ㉑, ㉒, and ㉓, and after the execution of the command L, the process is unconditionally jumped to the preceding address ㉒. In this case, since the destination of the jumping operation is beforehand known, the destination address can be generated by means of a separate memory or a separate gate, and the address thus obtained if forcibly set in the address register.

PREFERRED EMBODIMENTS OF THE INVENTION

Figure 3:
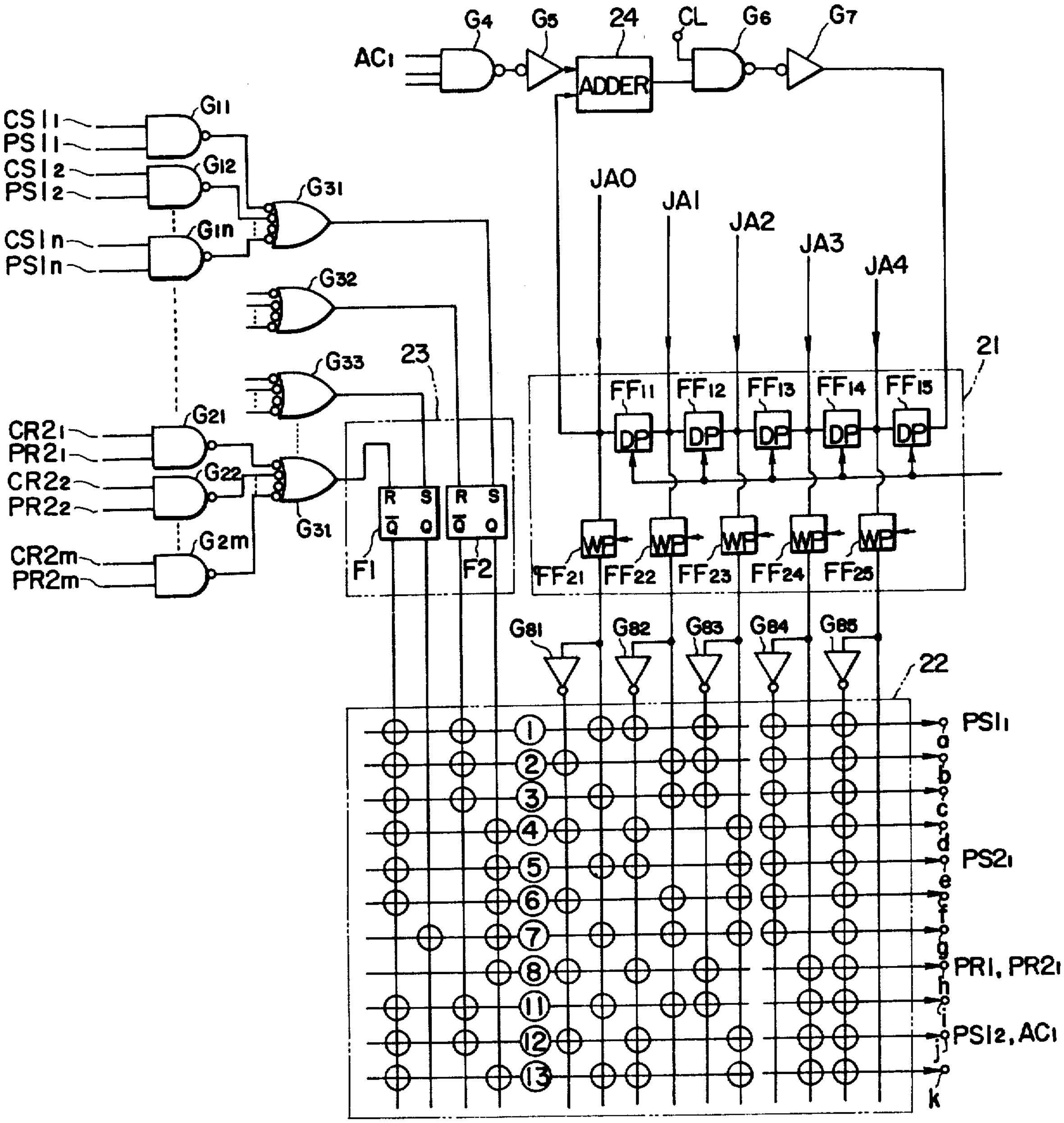

According to the present invention, there is provided a program control system constructed on the basis of the above-described basic concept and the above-described three kinds of programs can be thereby carried out with a simplified logic circuit. A preferred embodiment thereof is indicated in FIG. 3 wherein there is included an address register 21 comprising flip-flops FF11 through FF15 and FF21 through FF25. To the flip-flops FF11 through FF15 digit pulses DP are applied, and to the flip-flops FF21 through FF25 word pulses WP are applied. Each of the digit pulses and the word pulses are generated only one time in the corresponding digit and word. JA0 through JA4 designate jumping address signals applied to these flip-flops from the outside, which are directly set in the flip-flops FF21 through FF25. The outputs from the flip-flops FF21 through FF25 and the outputs of inverter gates G81 through G85 inverting the outputs of the flip-flops FF21 through FF25 are applied to the ROM 22, respectively. Round marks ◯in the ROM 22 indicate inserting positions of MOS type transistors or diodes, and① through ⑬ designate addresses in the ROM 22.

When signals are applied from the address register 21 to all of the ◯ marked positions in an address of the ROM 22, an output signal appears on the corresponding one of the output terminals *a* through *k* for the addresses①through ⑬. For instance, when attention is paid to the output terminal *a* for the first address①specifically, an output signal appears thereon only when '10000" is set in the flip-flops FF21 through FF25 of the address register 21. Appearance of the output signal on the terminal *a* causes execution of the command A. Likewise, the appearance of an output signal on the terminals *b*, *c*, *d*, . . . , causes the execution of the commands J1, B, C, . . . (in FIG. 2(A)), respectively.

A condition flip-flop circuit 23 includes two flip-flops F1 and F2, the outputs of which are supplied to the ROM 22. The conditions of the flip-flops F1 and F2 are controlled by the outputs $ps1_1$ through $ps1_n$ and $pr2_1$ through $pr2_m$ from the ROM 22 and the decision data $cs1_1$ through $cs1_n$ and $cr2_1$ through $cr2_m$ representing the execution results of the decision commands.

The operation of the program control system of this embodiment will now be described with respect to the case where the system is applied to the execution of the program shown in FIG. 2(A).

Initially, both of the condition flip-flops F1 and F2 have been reset thus delivering "0" from the Q output and "1" from the Q output. The flip-flops FF15 through FF11 in the address register 21 are set in this sequence to "00001", and the contents are shifted into the flip-flops FF25 through FF21 when word pulses arrive at the flip-flops. Accordingly, all of the ◯marked positions in the address①in the ROM 22 are filled by the signal "1", and an output signal is delivered from the terminal *a*. By the output signal from the terminal *a* the command A indicated in FIG. 2(A) is carried out. The contents of the flip-flops FF15 through FF11 are then shifted leftwardly, and one is added by an adder 24 to the thus shifted present address. That is, a new address of "00010" is obtained, and this address is passed through a NAND gate G6 and an inverter G7 to be set in the flip-flops FF15 through FF11. The new address is again shifted to the flip-flops FF25 through FF21 upon arrival of the word pulses, so that the second address②is selected in the ROM 22 and an output pulse $ps1_1$ is delivered from the terminal *b*. Delivering the output signal $ps1_1$ causes the system to execute the decision command $J_1$ in FIG. 2(A). The output signal $ps1_1$ and a signal $cs1_1$ showing the result of the decision are applied to a NAND gate G11. When the result of the decision is yes, that is, the $cs1_1$ is "1", the output of the NAND gate G11 is passed through another NOR gate G31 to the terminals *s* of the flip-flop F1, and Q output thereof is changed to "1" and the $\bar{Q}$ output thereof is changed to "0".

When the new contents of the flip-flops FF15 through FF11 in the address register 21 are again shifted to the adder 24 and one is added thereto, a further new address of "00011" is obtained. Since the condition flip-flop F1 is set as described above, no signal is introduced into the◯marked position in the address ③ corresponding to the flip-flop F1, whereby NAND logic in the address③cannot be executed and no signal is obtained from the terminal *c*. Thus, the command B in FIG. 2(A) is not carried out.

When the contents of the flip-flops FF15 through FF11 in the address register 21 are further added by one, the address is now changed to "00100", and the fourth address 4 is selected and an output signal is delivered from the terminal *d*. The delivery of the output from the terminal *d* causes the system to execute the command C in FIG. 2(A). By repeating the same procedure, the addresses⑤,⑥,⑦, and⑧are sequentially selected. However, when the address ⑥ is selected, NAND logic is not satisfied in the same address, and no output signal is delivered from the terminal *f* so that the command D in FIG. 2(A) is not executed. Furthermore, the clearing of the contents of the address register 21 can be carried out by applying "0" to the terminal C1 of the NAND gate G6. By this procedure, the contents in the adder 24 is prohibited from entering the address register 21 and the register 21 is thereby cleared.

The operation of the program control system according to this invention in the case of executing a program of the type shown in FIG. 2(B) will now be described. It is assumed that both of the condition flip-flops F1 and F2 are in the reset state. When an address "01011" is set in the address register 21, an address ⑪ is selected in the ROM 22 so that an output appears in the terminal *i* and the command H is thereby carried out. When the subsequent address "01100" is set in the address register 21, the subsequent address ⑫ is selected, so that an output signal appears at the terminal j and a decision command J3 is carried out. At the same time, a "0" signal is applied to a terminal AC1 of a gate G4, and the adder stops its operation for adding one to the present address. This means that the contents of the address register 21 is held to the same address. When the result of the decision command J3 is found to be NO, a logic product is obtained in a NAND gate G12 between the output signal $ps1_2$ from the terminal *j* and the decision data $cs1_2$, and the output from the NAND gate G12 is passed through a NOR gate G31 to the condition flip-flop F1. Accordingly, the Q output thereof is changed to "1" and the Q output thereof is changed to "0".

As a result, no signal is introduced to the position, marked with ○, corresponding to the output Q from the flip-flop F1 in the address ⑫ of the ROM 22, whereby no output signal is delivered from the terminal j. Thus, a signal "1" is again introduced into the terminal AC1 of the gate G4, and the adder 24 resumes its operation for adding one to the present address. The contents of the flip-flops FF15 through FF11 in the address register 21 are changed to "01101", so that the address ⑬ is selected and the command I is thereby executed.

The operation of the program control system in the case of executing the program, as shown in FIG. 2(C), will now be described with the simultaneous reference to FIG. 4.

Figure 4:
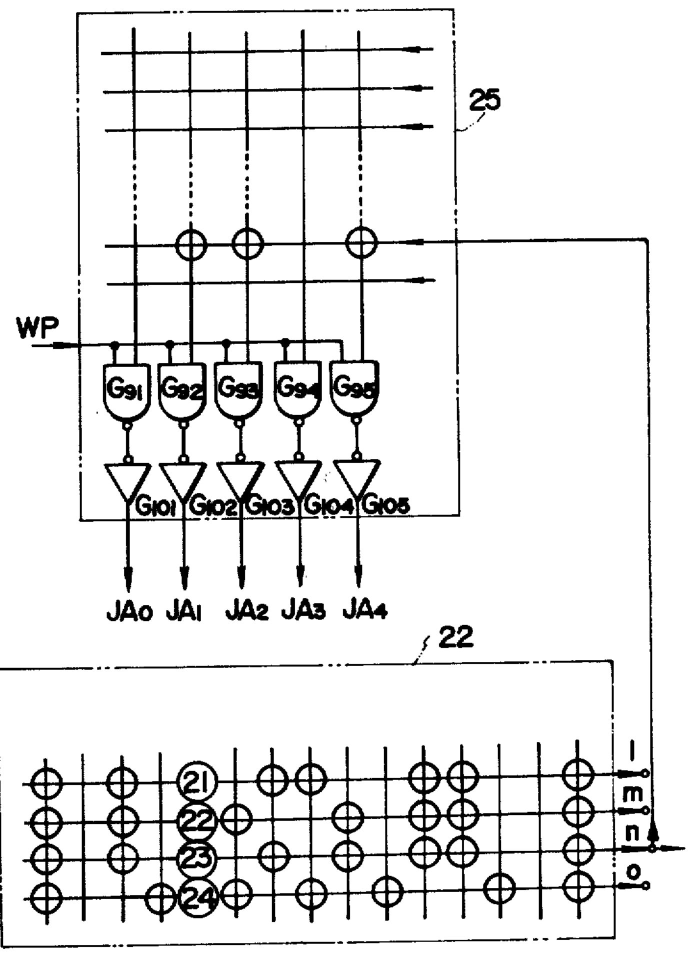
FIGS. 3 and 4 are block diagrams showing examples of the program control system according to the present invention.

In FIG. 4, numeral 22 designates a ROM similar to that in FIG. 3, and numeral 25 designates a jump address generating circuit. The jump address generating circuit 25 has MOS transistors or diodes inserted at positions marked with ○. The commands K, J4 and L corresponding to the addresses ㉑ , ㉒ , and ㉓ are executed in a similar manner as described hereinbefore, and an output signal from the output terminal *n* corresponding to the address ㉓ is introduced into NAND gates G91 through G95 in the jump address generating circuit 25. When the command L is executed, a pulse WP is also applied to the NAND gates G91 through G95 at the instant of the termination of the command L. The outputs of the NAND gates are passed through respectively provided inverters G101 through G105 to the flip-flops FF11 through FF15 in the address register 21. Since the contents of an ROM included in the jumping address generating circuit 25 connected with the output terminal from the address ㉓ is "10110" as clearly shown in FIG. 4, this address is forcibly set in the flip-flops FF11 and FF15. That is, the process is set back to the address ㉒ after the execution of the command corresponding to the address ㉓ . The above described operation is repeated while the result of the decision command J4 is YES, and when the result becomes NO, the process is advanced to the address ㉔ . In FIGS. 2(A), 2(B), and 2(C), full lines indicate routes followed when the Q outputs of the condition flip-flops F1 and F2 are both "0", broken lines indicate the routes followed when the Q outputs of the flip-flops F1 and F2 are "1" and "0", respectively, and one dot chain lines indicate routes followed when the Q outputs are "1" and *, respectively, wherein * designates a value which may be either "0" or "1".

As described herein in detail, according to the present invention, execution of ordinary programs is attained by simply adding one to an address of each preceding program so that the conventional setting back to an arbitrary address depending on the result of the decision command is eliminated. For this reason, the program control system according to this invention does not require any evacuation register to store the return addresses, and the construction of the system is thereby substantially simplified. Furthermore, since the system is provided with condition flip-flops, temporary stop of the address renewal and jumping to a predetermined address preceding the present address can be carried out in a simple manner.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What we claim is:

1. A program addressing control system comprising:

a read only memory having a coordinate array of input and output lines and means interconnecting selected crosspoints of said input and output lines, so that respective combinations of signals applied to said input lines will produce a signal on each output line, respective commands being executed in response to the signals from said output lines;

a plural stage address register, the outputs of respective stages of said address register being connected to respective input lines of said read only memory;

an adder having an input connected to the output of said address register for receiving an address signal stored therein and adding "1" to said address signal, and having an output connected to the input of said address register for setting the thus added result therein;

a plurality of condition flip-flops having outputs connected to additional input lines of said read only memory; and gating means, connected to said condition flip-flops, for controlling the state thereof in accordance with the output signals on the respective output lines of said read only memory and the signal indicating the result of executing the command designated by the output signals.

2. A program addressing control system as set forth in claim 1, further including gating means, connected to said adder, for inhibiting a signal to be applied to said adder to interrupt the adding operation upon receipt of a signal from a predetermined output terminal of the read only memory.

3. A program addressing control system as set forth in claim 1, further including address signal generating means, having outputs connected respective stages of the address register, for forcibly setting said address register into a preselected state in response to selected outputs of said read only memory.

4. A program addressing control system as defined in claim 3, wherein said address signal generating means includes a secondary read only memory in the form a matrix having input lines connected to selected output lines of said read only memory and output lines connected to the respective stages of said address register.

* * * * *